United States Patent
Stolzer (10) Patent No.: US 10,301,112 B2
(45) Date of Patent: May 28, 2019

(54) HONEYCOMB STORAGE SYSTEM AND COMMISSIONING DEVICE FOR A HONEYCOMB STORAGE SYSTEM

(71) Applicant: KEURO Besitz GmbH & Co. EDV-Dienstleistungs KG, Achern (DE)

(72) Inventor: Armin Stolzer, Baden-Baden (DE)

(73) Assignee: KEURO Besitz GmbH & Co. EDV-Dienstleistungs KG, Achern (DE)

( * ) Notice: Subject to any disclaimer, the term of this patent is extended or adjusted under 35 U.S.C. 154(b) by 106 days.

(21) Appl. No.: 15/417,346

(22) Filed: Jan. 27, 2017

(65) Prior Publication Data
US 2017/0217680 A1    Aug. 3, 2017

(30) Foreign Application Priority Data
Jan. 29, 2016 (DE) .................. 10 2016 101 674

(51) Int. Cl.
  *B65G 1/04* (2006.01)
  *B65G 1/137* (2006.01)

(52) U.S. Cl.
  CPC ......... *B65G 1/0442* (2013.01); *B65G 1/1378* (2013.01); *B65G 2201/0217* (2013.01)

(58) Field of Classification Search
  CPC .. B65G 1/1378; B65G 1/0442; B65G 1/0485; B65G 2201/0217; B65G 65/02;
  (Continued)

(56) References Cited

U.S. PATENT DOCUMENTS 4,063,653 A     12/1977 Halada
4,406,570 A  *  9/1983 Duncan ................ B65G 1/0442
                                                414/282
(Continued)

FOREIGN PATENT DOCUMENTS

DE     2541347    3/1977
DE     3223594    12/1983
(Continued)

OTHER PUBLICATIONS

Remmert GmbH: "Remmert Wabenlager—Mehrfachstation an Sage", Sep. 17, 2015, URL:https://www.youtube.com/watch?v=SDEV7u_pOFA, retrieved on Jul. 27, 2017.

*Primary Examiner* — Glenn F Myers
(74) *Attorney, Agent, or Firm* — Volpe and Koenig, P.C.

(57) ABSTRACT

A honeycomb storage system with at least one shelf unit, including a plurality of storage units arranged side-by-side and overtop of each other, accessible from an operating side, for receiving cartridges. The storage units are embodied such that the cartridges can be removed horizontally at the operating side in the longitudinal direction and can be inserted therein. A shelf operating device is arranged at an operating side and a commissioning device is arranged on a front side of the shelf opposite the operating side. The commissioning device is allocated to a plurality of storage units used as marshaling storage units, which are embodied such that cartridges located therein can also be removed at the front of the shelf. The commissioning device has several commissioning sites for placing cartridges as well as a commissioning cart that can move along the front of the shelf perpendicular in reference to the cartridges. This cart is embodied such that it can approach all commissioning sites. The commissioning device additionally includes a removal device that can move along the front of the shelf, perpendicular to the cartridges, for pulling cartridges out of the marshaling storage unit and returning them thereto.

19 Claims, 10 Drawing Sheets

(58) Field of Classification Search
CPC .... B66C 1/28; B66C 1/30; B66C 3/14; B66C 3/16; B66C 3/18; B66C 3/20
See application file for complete search history.

(56) References Cited

U.S. PATENT DOCUMENTS

| | | | | |
|---|---|---|---|---|
| 4,435,118 | A * | 3/1984 | Behrend | B66C 23/84 212/223 |
| 5,429,469 | A * | 7/1995 | Zimek | B65G 1/0485 414/277 |
| 7,011,487 | B2 * | 3/2006 | Kafka | B66F 9/07 414/459 |
| 8,366,371 | B2 * | 2/2013 | Maniscalco | H01M 2/1077 104/34 |
| 2006/0182554 | A1 * | 8/2006 | Stolzer | B63C 3/12 414/281 |

FOREIGN PATENT DOCUMENTS

| | | | |
|---|---|---|---|
| DE | 4213565 | 10/1993 | |
| DE | 19650538 | 6/1998 | |
| DE | 10138619 | 3/2003 | |
| EP | 0213070 | 3/1987 | |
| FR | 1595364 A * | 6/1970 | ........... B65G 1/0442 |
| GB | 1550199 | 8/1979 | |
| GB | 2025361 A * | 1/1980 | ............... B66C 1/28 |
| WO | 8303086 | 9/1983 | |
| WO | WO-2015001142 A1 * | 1/2015 | ........... B65G 1/0442 |

\* cited by examiner

HONEYCOMB STORAGE SYSTEM AND COMMISSIONING DEVICE FOR A HONEYCOMB STORAGE SYSTEM

INCORPORATION BY REFERENCE

The following documents are incorporated herein by reference as if fully set forth: German Patent Application No.: DE 102016101674.8, filed Jan. 29, 2016.

BACKGROUND

The present invention relates to a honeycomb storage system comprising at least one shelf, which has a plurality of storage units arranged side-by-side and overtop of each other for receiving cartridges, which are preferably used for storing long goods. The storage units are accessibly from an operating side of the shelf, where a shelf operating device is provided. The storage units are here embodied such that the cartridges can be removed from the storage units and inserted therein horizontally in the longitudinal direction.

Honeycomb storage systems of this type serve for storing generally elongated work pieces, frequently called long goods, such as profiles, rods, and rails, frequently measuring several meters and, due to the fact that they have insufficient inherent stability and for protecting their surfaces, they are frequently inserted into the honeycomb storage system provided inside cartridges. The alignment of the storage units in a honeycomb storage system allows the integration of a plurality of storage units in a shelf and to allow access thereto because the faces of the work pieces and thus also those of the cartridges in which the work pieces are housed are normally small in reference to their longitudinal extension. Simultaneously the cartridges can be easily pulled from longitudinally out of the shelf and inserted therein. The number of storage units accessible from one side of the shelf is therefore optimized by this arrangement.

Long goods warehoused in such a honeycomb storage system are generally stored in bundles of identical work pieces using cartridges, however they are not removed one cartridge at a time but usually, depending on the order, it must be commissioned from different cartridges storing (long goods). Such an order can originate here for example from a customer of a steel trader, warehousing the goods in a honeycomb storage unit, or also from the production department of a producing company, storing semi-finished goods in an in-house honeycomb storing unit. Sometimes for a specific product, for example a window, work pieces must be obtained from typically ten different cartridges housing long goods, for example ten different profiles, and assembled and/or commissioned for an order.

For this purpose a honeycomb storage system of the present type has at a front of at least one shelf, opposite an operating side, a commissioning device by which individual commissions are assembled and prepared for removal. This commissioning device is allocated to a plurality of storage units in the shelf near the ground, with these storage units being embodied as marshaling storage units. This means that any cartridges located therein can also be removed at the front of the shelf. Typically there are only few marshaling storage units in a conventional honeycomb storage system and the commissioning process must be performed manually.

In order to assemble a commission, the work pieces to be obtained from the honeycomb storage system are requested by a superonlinate warehouse management system or an operator, the commissioner, such that the shelf operating device successively retrieves the cartridges housing the requested work pieces out of their storage units and places them into the marshaling storage unit, or if several such units are available, into the marshaling storage units. From there they can then be pulled at the front of the shelf into the commissioning device. There the required number of work pieces located therein is removed and commissioned in another cartridge or on the warehouse floor.

A conventional commissioning device commonly comprises several commissioning sites, on which cartridges or other transportation units are arranged for the work pieces, particularly long goods. Supported by mobile lifts and cranes here operators pull the cartridges rendered available in the marshaling storage units out of the shelf and remove the number of work pieces required for a commission in order to place them onto the respective commissioning site. Thereafter the operators put the cartridge with the work pieces not required back onto the marshaling storage unit, from where they are returned by the shelf operating device to the actual storage unit.

In particular the processing step of removing required work pieces from the cartridge until placing them onto the respective commissioning site is very time-consuming in the procedures of prior art, with here sometimes traveling over long distances being required when several commissioning sites are operated side-by-side.

SUMMARY

The present invention is therefore based on the objective to improve a honeycomb storage system of the present type with regards to its commissioning device such that the processing steps during commissioning are optimized.

This objective is attained in a honeycomb storage system and a commissioning device with one or more features of the invention, as well as a commissioning cart with one or more features of the invention. Advantageous embodiments and variants of the invention are disclosed below and in the claims.

The commissioning device of a honeycomb storage system according to the invention therefore comprises several commissioning sites, which particularly serve for placing cartridges, as well as a commissioning cart, which is mobile along the front of the shelf, perpendicular in reference to the cartridge. The commissioning cart is here embodied such that it essentially can approach all commissioning sites.

The commissioning device comprises according to the invention also a removal device for pulling cartridges out of the marshaling storage units and returning them back thereto, with these removal devices also being mobile along the front of the shelf, perpendicular in reference to the cartridges.

Within the scope of the present invention the removal device can be arranged at the commissioning cart or perhaps represent a part thereof, or the removal device is independent from the commissioning cart such that the commissioning cart and the removal device can be moved independently from each other and can approach separately essentially all commissioning sites.

The removal device according to the invention allows qualifying a plurality of storage units, preferably near the ground, as marshaling storage units, from which cartridges can be taken for commissioning. This allows a simultaneous commissioning, while conventionally a single or maximally two fixed lanes are arranged at the front of the shelf by which cartridges can be moved out of one or perhaps two marshalling storage units for commissioning and then can be returned thereto, unless the cartridges are pulled out of the shelf manually anyways.

The commissioning cart allows temporary storage in the commissioning cart of work pieces taken from a cartridge and for movement of them to the respective commissioning site, where they are then placed into a commissioning cartridge or ground storage. This accelerates the respective process not only by eliminating distances to be travelled by the operator, but also offers the possibility to operate simultaneously several commissioning sites with the removal device, in cooperation with several marshaling storage units. The present invention therefore significantly accelerates the commissioning process from a honeycomb storage system and renders it more flexible.

An ever better acceleration and flexibility for the commissioning process is yielded with a preferred removal device according to the invention, which comprises at least two operating levels in order to optionally cooperate with two or more marshalling storage units arranged over top of each other. Such a removal device is additionally provided with a lifting and lowering device for moving the cartridges between the operating levels, so that the removal device can approach all commissioning sites. Simultaneously, unlike the commissioning process of prior art, here even more marshaling storage units are possible that can be rendered available for the commissioning process.

The removal device is preferably equipped with a longitudinal traverse, which is adjusted to the length of a cartridge such that it longitudinally straddles it. Beneficially then a motorized manipulation device is provided for pulling and pushing a cartridge along the longitudinal traverse.

Due to the fact that it is possible with the invention to implement a relatively large number of marshaling storage units, here partial orders or completely commissioned orders assembled in a cartridge can be temporarily stored in the marshalling storage units such that the respective commissioning sites are cleared. This further increases the flexibility during the commissioning process. For example, completely commissioned cartridges can be removed by the shelf operating device out of the marshalling storage unit and moved to a storage unit in the honeycomb storage system in order with such a temporary storage utilizing flexible time bands and times of low order numbers for commissioning less time sensitive orders.

If the removal device is not arranged at the commissioning cart but is independent therefrom, it is preferred within the scope of the present invention for the longitudinal traverse of the removal device to be connected at its facial end sections to a cart, guided mechanically or electrically, particularly running on rails, with the carts together with the longitudinal traverse forming a clear space underneath the longitudinal traverse, which is adjusted to the dimensions of a cartridge such that the removal device can drive unhindered over cartridges placed on commissioning sites. At least the cart arranged towards the front of the shelf should here be provided with an opening or a recess for pulling or pushing a cartridge through it such that the motorized manipulation device can unhindered remove the cartridges at the longitudinal traverse out of the marshaling storage units and/or insert them back therein. If the removal device is equipped with several operating levels the opening or recess in the cart can allow pulling or pushing a cartridge through it in every operating level.

The commissioning cart of the honeycomb storage system according to the invention preferably comprises at least one intermediate storage structure for temporarily storing long goods. The intermediate storage structure has a length adjusted to the length of a cartridge in order to longitudinally straddle it. It may essentially comprise a traverse with lateral braces arranged thereat such that long goods stored in a cartridge can be removed therefrom and can very easily be lifted up to the traverse in order to finally be placed onto the lateral braces of the traverse. After the commissioning cart has then been moved to the respective commissioning site the long goods can be placed by the intermediate storage structure into the appropriate cartridge.

The intermediate storage structure of the commissioning cart is preferably connected at its face with a mechanically or electronically guided cart element, particularly guided by rails. Together with the intermediate storage structure the cart elements form a clear space underneath thereof, which is adjusted to the dimensions of a cartridge such that the commissioning cart can unhindered drive over the cartridges, which are placed on the commissioning sites. This way it is possible that the commissioning cart can approach any commissioning site, regardless if the commissioning sites are empty or occupied.

The commissioning cart may also be embodied without any intermediate storage structure showing cart elements at the front, particularly when it is equipped with at least one manipulator, for example a robot, for the work pieces. This way the commissioning can then occur completely without any human operator.

The guides particularly when embodied as rails for the guided cart elements of the commissioning cart as well as perhaps also for guided carts of the removal device beneficially extend at a short distance from the front of the commissioning sites and/or the cartridges placed thereon in the perpendicular direction thereof, thus parallel to the front of the shelf.

Particularly preferred, the commissioning cart of the honeycomb storage system according to the invention comprises an operator platform at least on one of its cart elements; particularly preferred both cart elements are provided with one operator platform each. Respectively one or more operators may be present on these operator platforms in order to remove long goods from cartridges and to temporarily store them on the intermediate storage structure of the commissioning cart. Here, the long goods are engaged at the face by preferably two operators and lifted. At the commissioning site the long goods are then inversely grasped by the intermediate storage structure of the commissioning cart and inserted into the cartridge placed on the commissioning site. Preferably, the motion of the commissioning cart as well as perhaps also the motion of the removal device can be controlled from this operator platform.

The commissioning sites of the honeycomb storage system according to the invention preferably comprise support structures for cartridges, with their level being essentially equivalent to the level of the lowermost marshaling storage units in the shelf. Then the cartridges can very easily be pulled out of the marshalling storage units onto the support structure of the commissioning sites and vice versa from the commissioning sites inserted back in to the marshalling storage units.

BRIEF DESCRIPTION OF THE DRAWINGS

Based on the attached drawings, in the following four exemplary embodiments of the honeycomb storage system designed according to the invention and/or the commissioning unit embodied according to the invention with a commissioning cart are described and explained. Shown are.

DETAILED DESCRIPTION OF THE PREFERRED EMBODIMENTS

Figure 1:
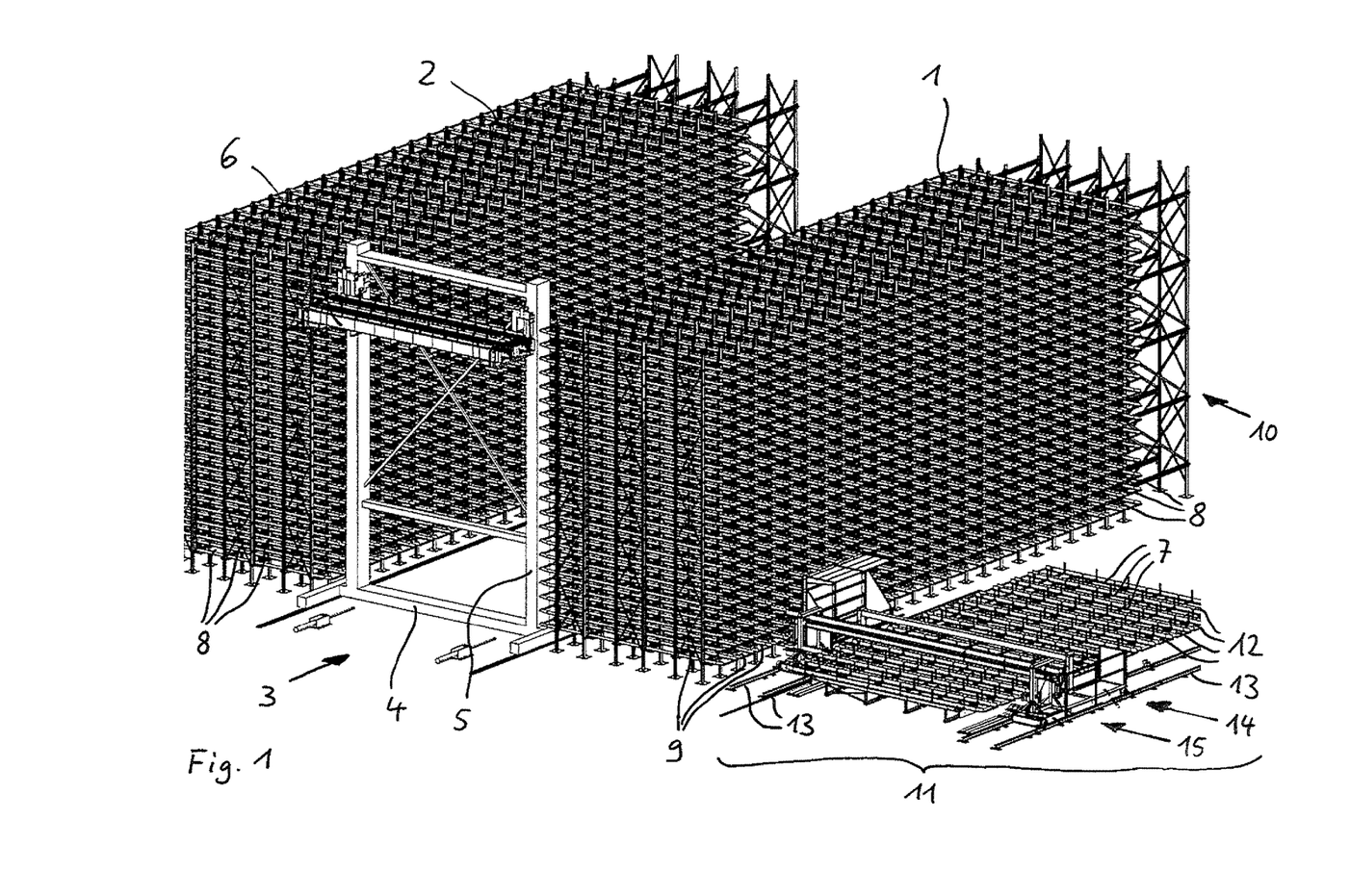
FIG. 1 a schematic, isometric illustration of a honeycomb storage system embodied according to the invention in a first exemplary embodiment.

FIG. 1 shows in a schematic isometric illustration a first exemplary embodiment for a honeycomb storage system according to the invention. This honeycomb storage system is particularly provided for long goods and comprises a first shelf unit 1 and a second shelf unit 2, allowing a shelf operating device 4 to move between them in a shelf path 3. This shelf operating device 4 essentially comprises a chassis 5, which can move horizontally along the shelf path 3, as well as a lifting sled 6, which can move up and down the chassis 5 and which is provided with a load receiving unit, capable to insert the cartridge 7, in the present case embodied as a cartridge for long goods, longitudinally into the individual storage units 8 in the honeycomb storage system or to pull them out of the individual storage units 8 onto the lifting sled 6.

The shelves 1, 2 of this honeycomb storage system essentially comprise a plurality of supports and a plurality of longitudinal and lateral braces, which form a plurality of honeycomb-like arranged storage units 8, here arranged in the form of lines and columns. The operating side of the shelves 1, 2 is here aligned towards the shelf path 3 such that the shelf operating device 4 can approach and service every individual storage unit 8.

The cartridges 7 comprise two facial sides and two longitudinal sides, with the facial sides having significantly smaller dimensions than the longitudinal sides. The shelves 1, 2 of the honeycomb storage system, when seen from the shelf path 3, have a great depth to allow receiving cartridges 7 such that one of their facial sides are oriented towards the shelf path 3 and thus toward the operating side.

The cartridges 7 are therefore inserted longitudinally into the storage units 8. Due to the relatively small dimensions of the facial sides here particularly many storage units 8 result which can be approached by the shelf operating device 4 in the shelf path 3.

In order to allow commissioning a customer order or a production order, the shelf operating device 4 successively removes the cartridges 7 with the different work pieces required out of the shelves 1, 2 and pushes them into the cleared storage spaces 8 located near the ground and qualified as marshaling storage units 9. These marshaling storage units 9 are open towards a front 10 of the shelf such that even at the front 10, opposite the operating side of the shelf 1, they can be removed from the shelf 1.

A commissioning device 11 is located ahead of the front side 10 of the shelf 1, comprising a plurality of commissioning sites 12 for cartridges 7, with rails 13 extending perpendicularly, and a commissioning cart 14 traveling on the rails 13, which cart is combined with the removal device 15 according to the first exemplary embodiment shown here.

Figure 2:
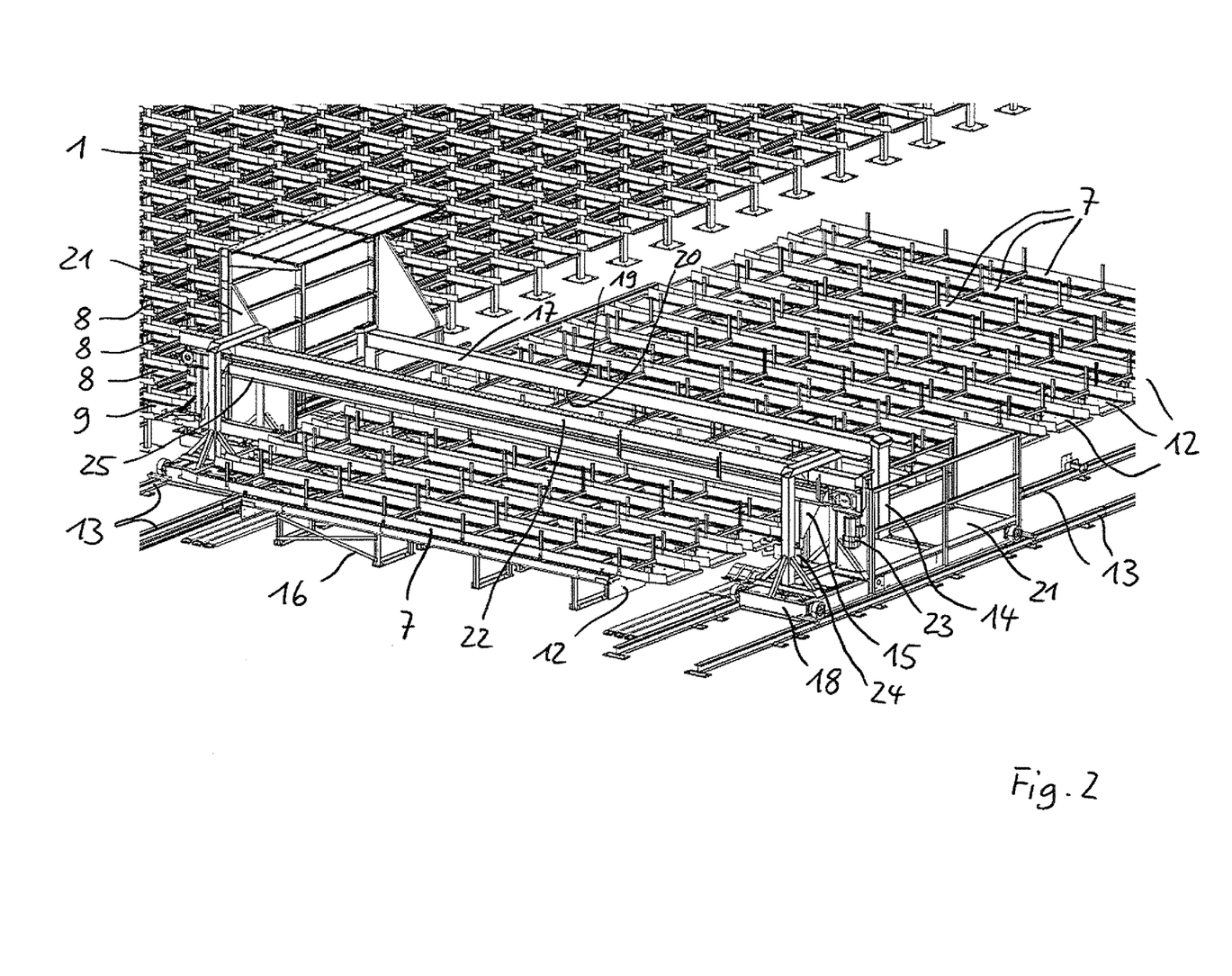
FIG. 2 a detail of FIG. 1 comprising the commissioning device of a honeycomb storage system.

FIG. 2, showing an enlarged detail of FIG. 1, better discloses the commissioning device 11 and its components. A multitude of commissioning sites 12 are occupied by one cartridge 7 each, resting on respectively a support structure 16, in order to generate equal levels with the marshaling storage units 9 of the shelf 1. This is illustrated in FIGS. 3 and 4, which display a front view and a side view of the commissioning device 11 shown in FIG. 2.

Figure 3:
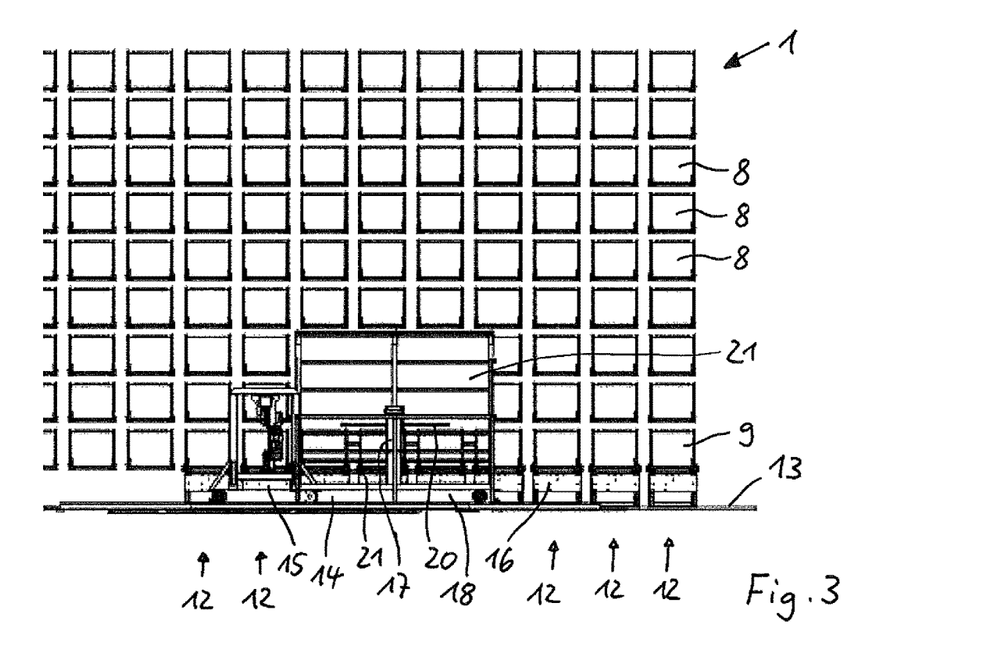
FIG. 3 a front view of the commissioning device of FIG. 2.
Figure 4:
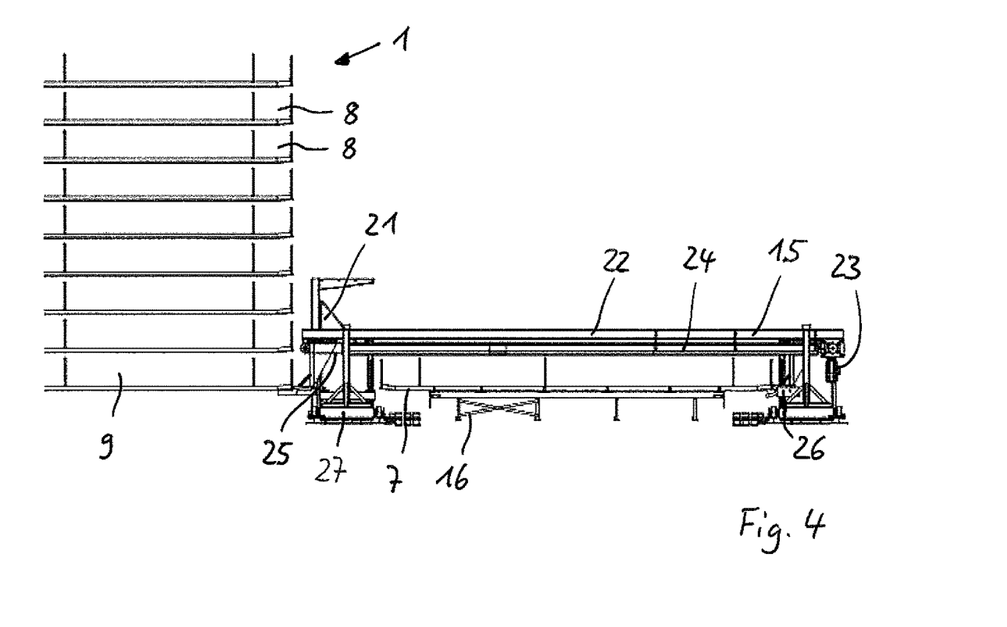
FIG. 4 a side view of the commissioning device of FIG. 2.

As discernible from FIGS. 2, 3, and 4, the commissioning cart 14 essentially comprises an intermediate storage structure 17, which is connected at the front respectively with a cart element 18 guided on rails, and together with it forms a clear space which is adjusted to the dimensions of the cartridges 7 placed on the commissioning sites 12. They are longitudinally straddled by the intermediate storage structure 17 and with the help of the cart elements 18 running on rails 13 the commissioning cart 14 can then also approach all commissioning sites 12 when they are occupied with cartridges 7.

The intermediate storage structure 17 of the commissioning cart 14 comprises in turn essentially a traverse 19, with lateral braces 20 being fastened thereat in regular intervals in order to allow temporarily storing long goods.

Operator platforms 21 are fastened on both cart elements 18 that can be occupied by operators 21, who can ride with the commissioning carts 14 and from which operating persons are capable of grasping long goods out of a cartridge 7 respectively at their faces, lift them, and place them onto the lateral braces 20 of the intermediate storage structure 17 and vice versa.

It is also possible for example to pick up work pieces out of a cartridge 7, for example located on the commissioning site 12 shown at the very left, and the commissioning cart 14 receives them, temporarily stores them on its intermediate storage structure 17, and sorts them to several commissions located in the other cartridges 7 on the commissioning sites 12. Due to the fact that in the present example all storage units 8 of the shelf 1 located aligned to the commissioning sites 12 are qualified as marshaling storage units 9 additionally here more than one cartridge 7 filled with work pieces to be distributed can be pulled out of the shelf 1 in order, with the help of the commissioning cart 14, to remove work pieces and to distribute them to other commissioning sites 12. It is also possible to return a completely commissioned order located in a cartridge 7 on a commissioning site 12 into a marshaling storage unit 9, wherefrom it can be brought via a shelf operating device 4 into an arbitrary storage unit 8 in the honeycomb storage system in order to be fetched out of the honeycomb storage system at a later point of time.

The commissioning cart 14 shown in FIGS. 2, 3, and 4 comprises, in addition to the intermediate storage structure 17, the two cart elements 18, and the operator platforms 21, also a removal device 15, which rests on the cart element 18 as well and together with the commissioning cart 14 it can be displaced perpendicularly along the rails 13. The removal device 15 comprises here essentially a longitudinal traverse 22 and a motorized manipulation device 24, operated by an electric motor 23, for pulling and pushing a cartridge 7 along the longitudinal traverse 22. This manipulation device 24 comprises a guide with a circumferential roller chain 25 as well as a manipulator 26 arranged thereat by which the cartridges 7 can be pulled or pushed along the longitudinal traverse 22 in order to relocate them from a commissioning site 12 into a marshaling storage unit 9 and vice versa. The cart element 18 of the commissioning cart 14 oriented towards the front 10 of the shelf is for this purpose provided with an opening, which in the present case is simply the clear space between the supports carrying the longitudinal traverse 22 in order to allow pulling or pushing cartridges 7 through it.

Figure 5:
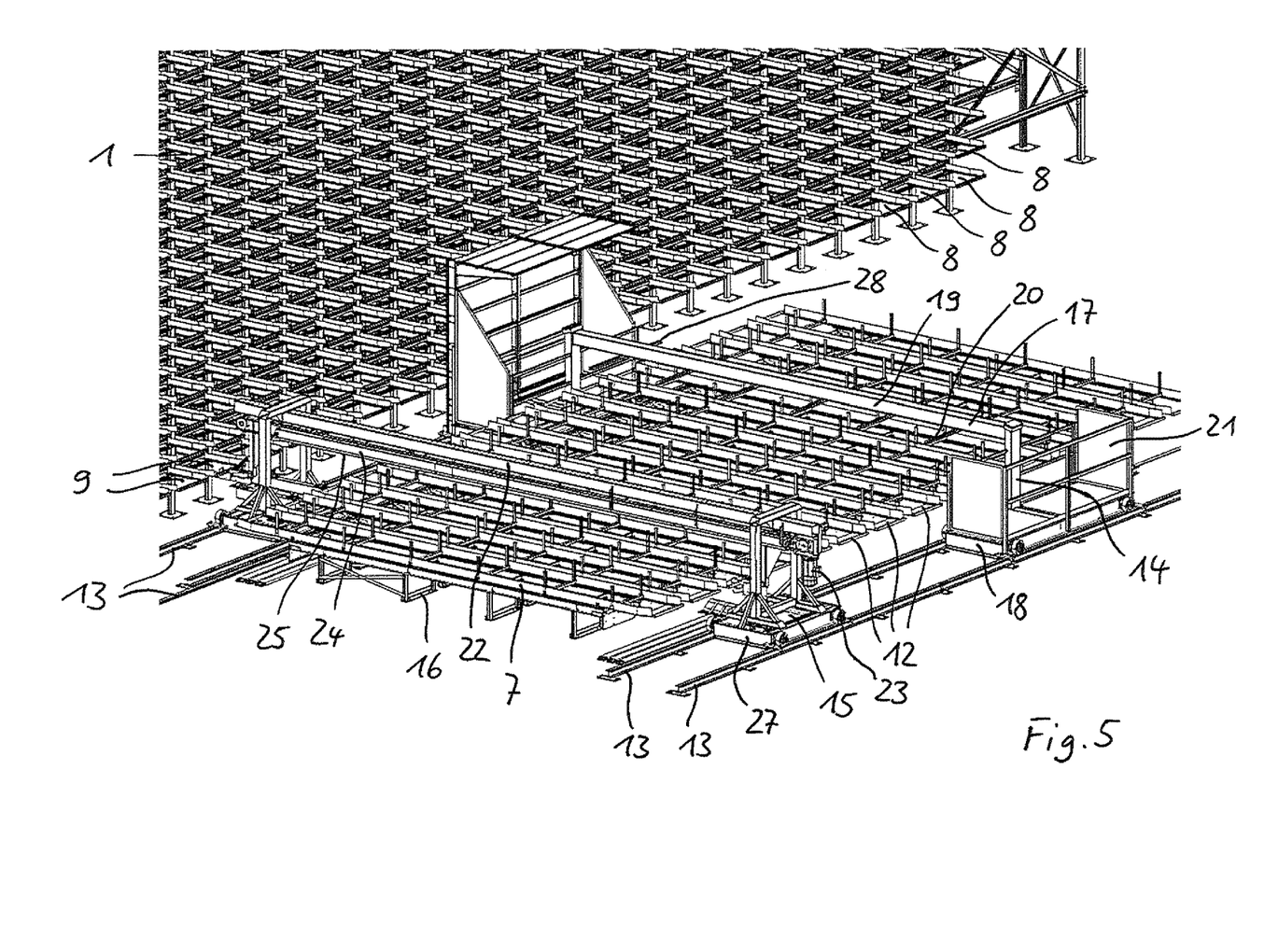
FIG. 5 an isometric illustration of a commissioning device according to a second exemplary embodiment.
Figure 6:
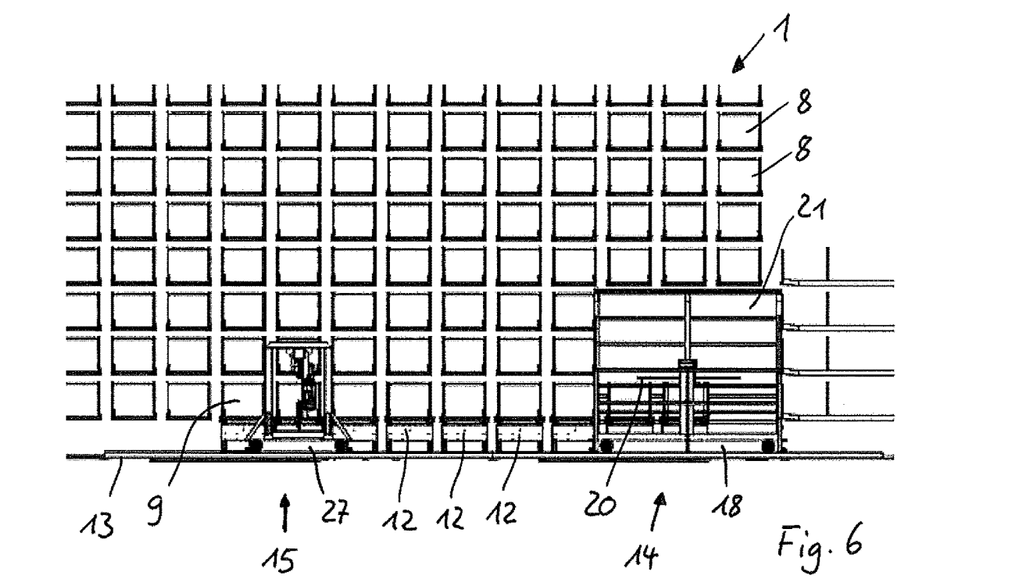
FIG. 6 a front view of the commissioning device of FIG. 5.
Figure 7:
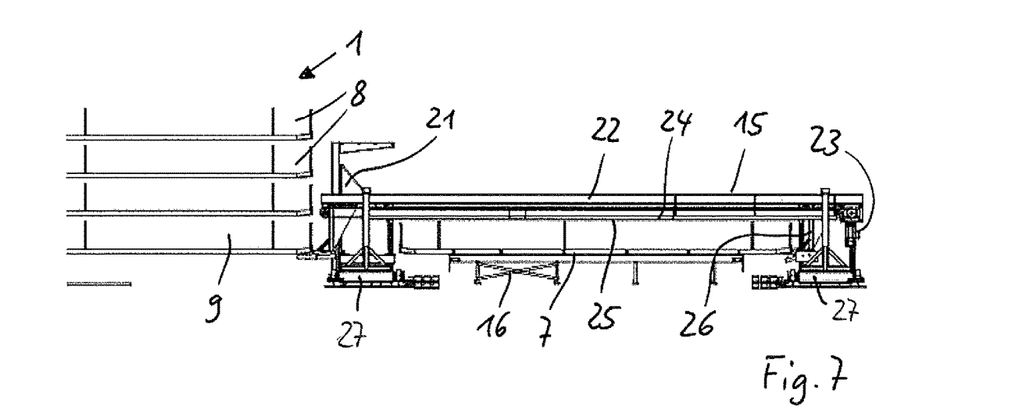
FIG. 7 a side view of the commissioning device of FIG. 5.

FIGS. 5, 6, and 7 show a commissioning unit 11 in an isometric illustration, a front view, and a side view, which forms a second exemplary embodiment of the present invention. The difference to the exemplary embodiment shown in FIGS. 1 to 4 comprises that the commissioning cart 14 and the removal device 15 are separate devices and can be moved independent from each other along the rails 13. For this purpose the removal device 15 is provided with a separate rail-based cart 27, carrying the longitudinal traverse 22 as well as the manipulation device 24, and together with them forms a clear space by which the removal device 15, longitudinally straddling the commissioning sites 12 and the cartridges 7 placed thereupon, can be enabled to laterally drive over the commissioning sites 12 with the cartridges 7. The removal device 15 can here be controlled by a control panel 28 arranged on the two operator platforms 21 of the commissioning cart 14.

The design of the removal device 15 per se, as well as the design of the commissioning cart 14 per se, remained otherwise unchanged in reference to the exemplary embodiment of FIGS. 1 to 4, so that reference can be made to the above-stated description.

Figure 8:
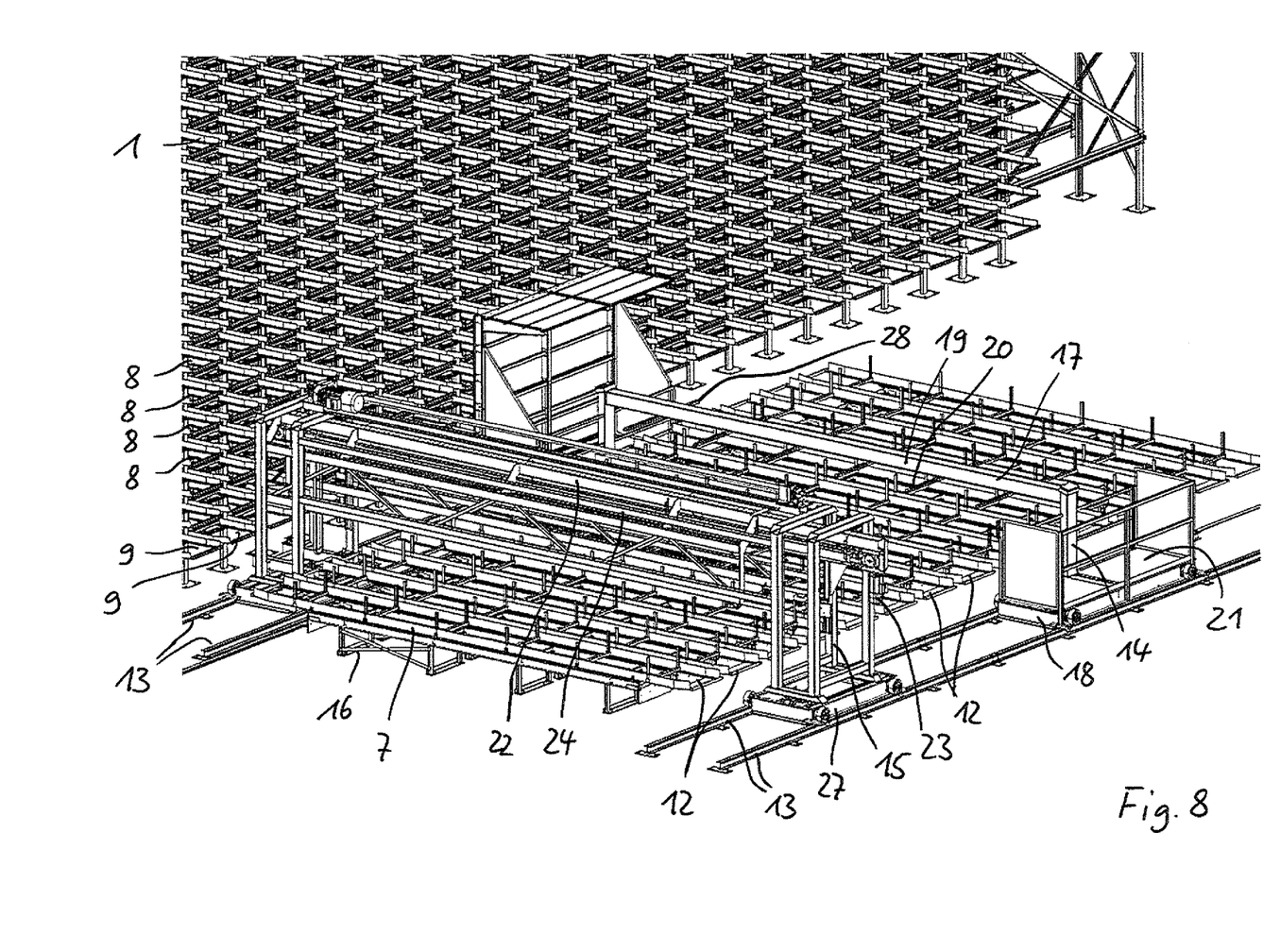
FIG. 8 an isometric illustration of a commissioning device according to a third exemplary embodiment.
Figure 9:
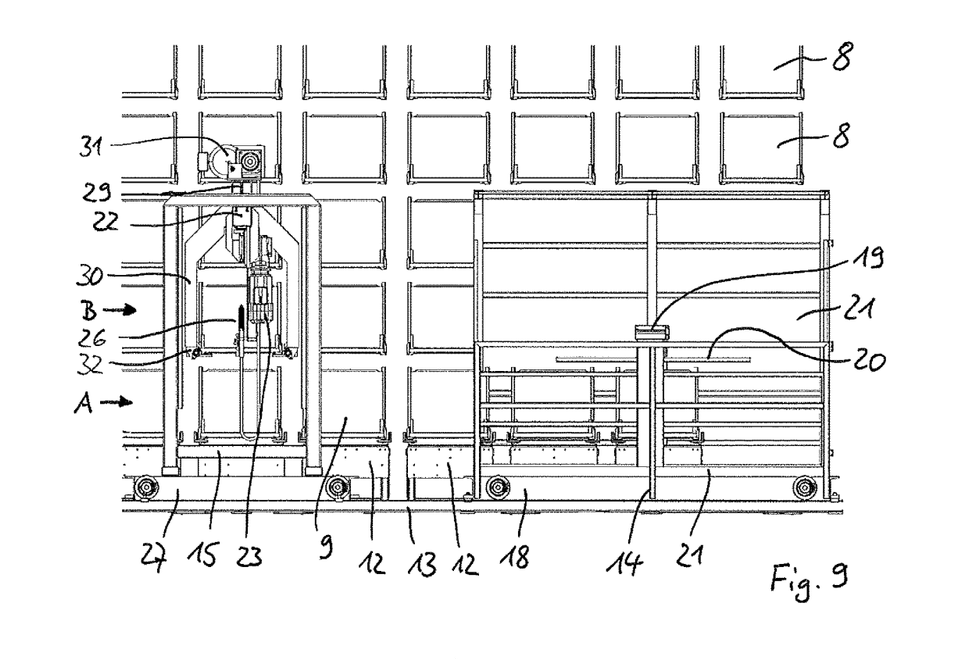
FIG. 9 a front view of the commissioning device of FIG. 8.
Figure 10:
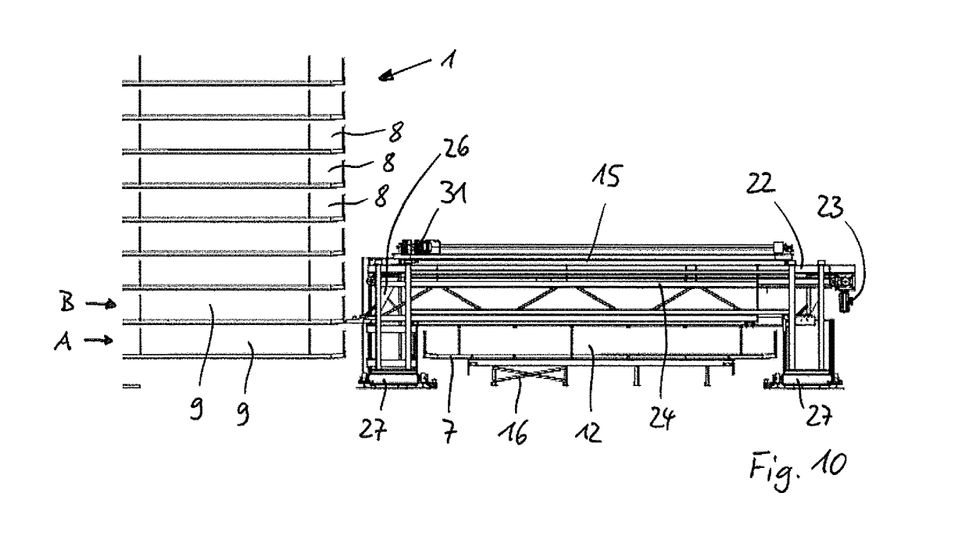
FIG. 10 a side view of the commissioning device of FIG. 8.

FIGS. 8, 9, and 10 once more show in an isometric illustration, a front view, and a side view a third exemplary embodiment for a honeycomb storage system embodied according to the invention. It differs from the two previous exemplary embodiments once more by a different design of the commissioning device 11.

Similar to the second exemplary embodiment, in this third exemplary embodiment the commissioning cart 14 and the removal device 15 are separate devices, which can be moved along the rails 13 independent from each other. While here the commissioning cart 14 is identical to the commissioning cart of the second exemplary embodiment, the removal device 15 is modified in the present third exemplary embodiment. Here the removal device 15 comprises two operating levels A and B (FIG. 9) such that with this removal device 15 cartridges can be withdrawn from the two lowermost levels of the shelf 1. Thus, the number of potential marshaling storage units 9 in the shelf 1 is doubled.

The two operating levels A, B of the removal device 15 are served by the very same manipulation device 24; because the removal device 15 comprises a lifting unit 29, which comprises support arms 30 and a lifting drive 31, with the support arms 30 via foldable levers 32 simultaneously forming a fastening for cartridges 7 which are held in the upper operating level B. The support arms 30 are fastened at the longitudinal traverse 22, and the longitudinal traverse 22 is also moved with the manipulation device by the lifting unit 29 and its lifting drive 31 between the operating levels A and B such that the removal device 15 can cooperate in both levels A, B with the respective marshaling storage units 9.

The second operating level B offers additionally the advantage that the removal device 15 can lift a cartridge, withdrawn from a marshaling storage unit 9, into the upper operating level B and leave it there in order to drive with this cartridge 7 over all commissioning sites 12 even if additional cartridges 7 are located there. A removal device 15 operating only in one level can however only move back and forth between marshaling storage sites 9 and commissioning sites 12 aligned thereto. This third exemplary embodiment further increases the flexibility during the commissioning process.

Of course, in addition to these three exemplary embodiments, the scope of the present invention includes of course many variants thereof. For example, the commissioning cart 14 can be equipped with an integrated removal device 15, which shows two operating levels A, B. When work pieces shall be commissioned, which are too heavy for two operators manually and temporarily buffering them in the intermediate storage structure 17 of the commissioning cart 14, the commissioning cart 14 can be equipped with auxiliary aggregates, for example a gantry crane. Instead of commissioning the work pieces by operating personnel, a commissioning cart can also be equipped with manipulators, for example an industrial robot. The removal device 15 can for example be provided with two manipulation units, operating independently, if it comprises two operating levels A, B, in order to even further increase flexibility, or it may comprise two or more operating levels or the like.

Figure 11:
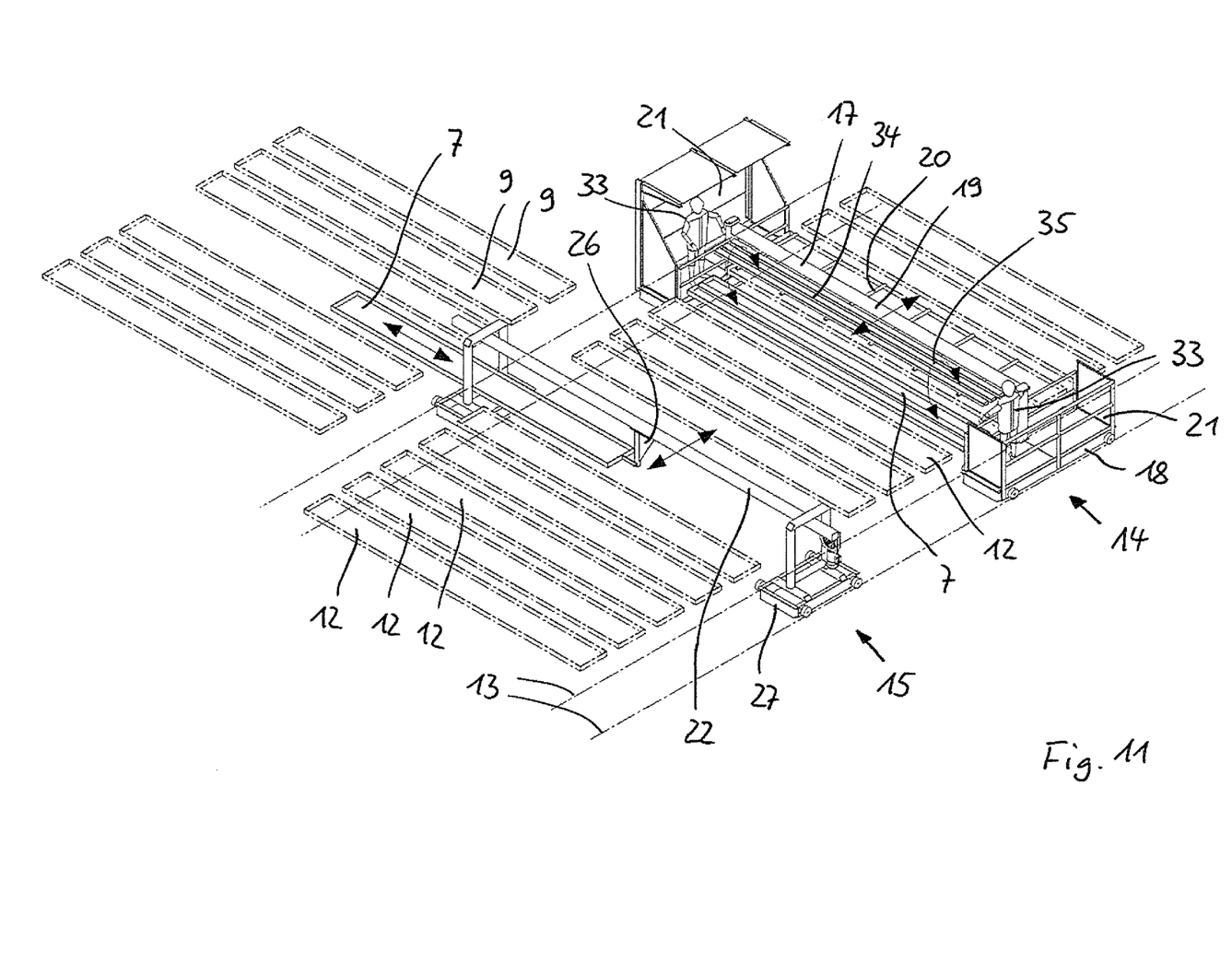
FIG. 11 a simplified, schematic isometric illustration of a commissioning device according to the second exemplary embodiment.
Figure 12:
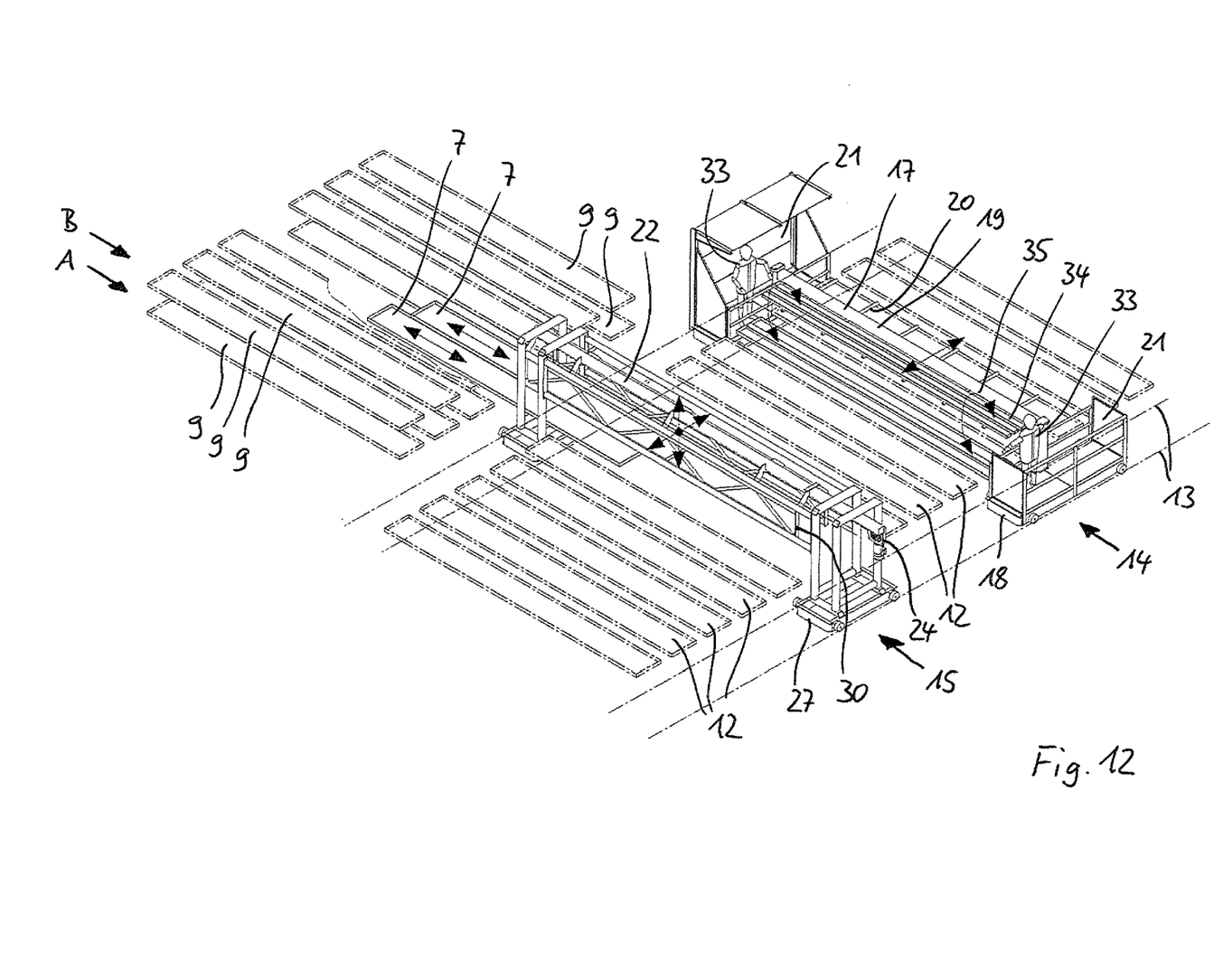
FIG. 12 a simplified, schematic isometric illustration of a commissioning device according to the third exemplary embodiment.
Figure 13:
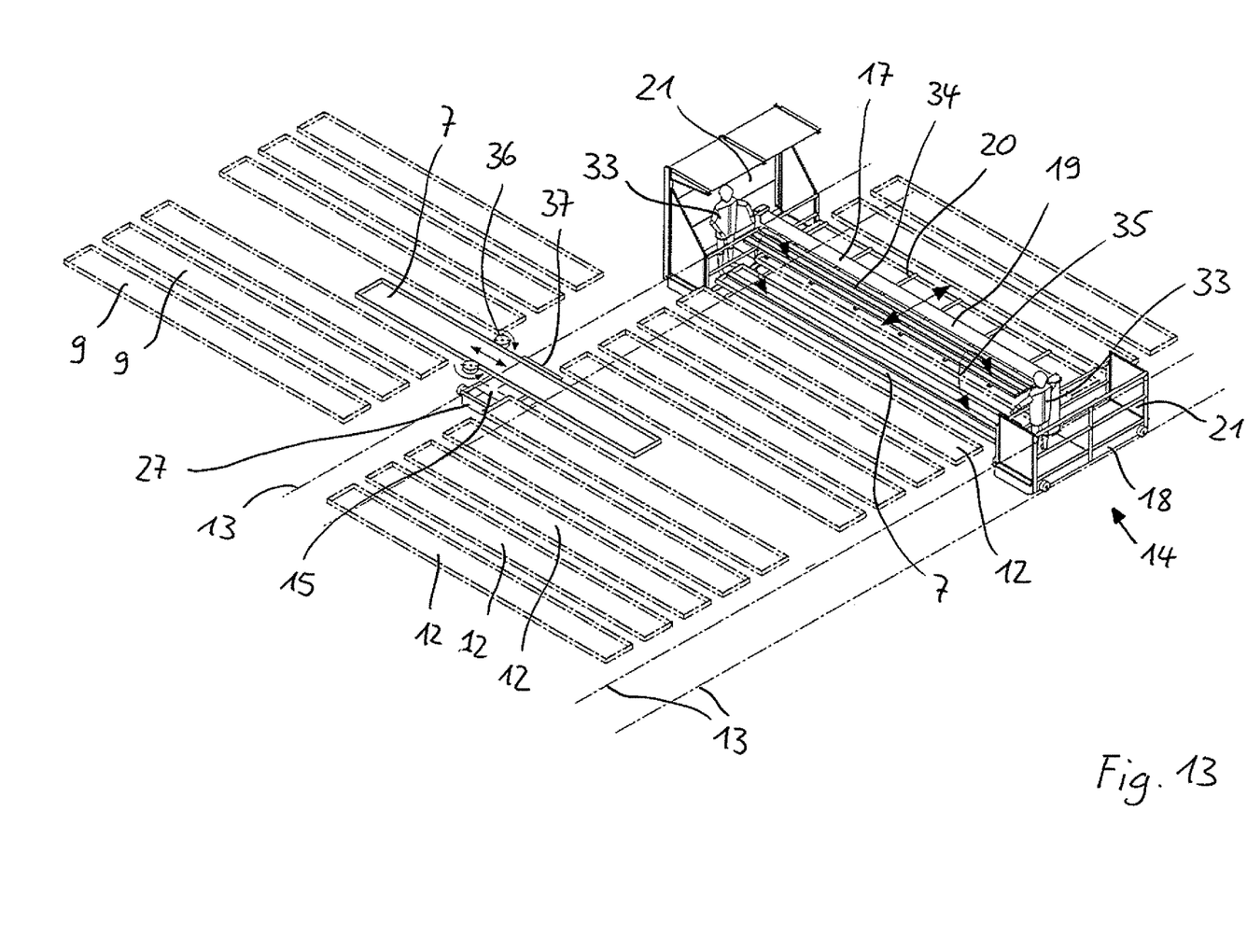
FIG. 13 a simplified, schematic isometric illustration of a commissioning device according to a fourth exemplary embodiment.

Based on simplified illustrations of commissioning devices 11 designed according to the invention FIGS. 11, 12, and 13 finally show the procedures during the commissioning process in the honeycomb storage system according to the invention based on a second exemplary embodiment (FIG. 11) and/or based on the third exemplary embodiment (FIG. 12) and/or based on a fourth exemplary embodiment (FIG. 13).

In these figures two operators 33 are shown, who are positioned on the commissioning cart 14 and on its two operator platforms 21, respectively. Three profiles 34 are temporarily stored on the intermediate storage structure 17 of the commissioning cart 14, which rest on the lateral braces 20 of the intermediate storage structure 17. As indicated by double arrows 35, the profiles 34 can be manually removed by the operators 33 from the intermediate storage structure 17 and inserted into a cartridge 7 resting on the present commissioning site 12. For example, here a profile is placed into the cartridge 7 and then the commissioning cart 14 is moved to the adjacent commissioning site 12, where the next profile 34 is placed into the cartridge 7 located there. Inversely, profiles 34 can be removed from a cartridge 7 and placed onto the intermediate storage structure 17 of the commissioning cart 14 in order to distribute them to various commissions.

Simultaneously and independently from the commissioning cart 14 the removal device 15 can here fetch a cartridge 7 from a marshaling storage unit 9 of the shelf (not shown here) and pull it onto a commissioning site 12. This occurs in the removal devices of FIGS. 11 and 12 via the manipulator 26, which can be moved by a motor along the longitudinal traverse 22. The manipulator 26 is provided with a link, which can pull and push the cartridge 7 and can be detached therefrom.

As indicated by double arrows, both the removal device 15 as well as the commissioning cart 14, each straddling the cartridge 7 on the commissioning sites 12, can be driven perpendicularly to all commissioning sites 12.

The removal device 15 shown in FIG. 12 comprises here two operating levels A, B, which can be used alternating via a lifting device by moving up and down the longitudinal traverse 22 including the manipulation device 24 as well as the support arms 30.

The fourth exemplary embodiment of the invention shown in FIG. 13 differs from the second exemplary embodiment only in an altered embodiment of the removal device 15. It essentially comprises only a rail-based cart 27, on which the motor-driven manipulation device is formed for pulling and pushing a cartridge 7 as the friction drive 36. It essentially comprises two motorized friction wheels, between which a cartridge 7 can travel. At least one longitudinal guide 37 ensures for a correctly aligned motion of the cartridge 7. A longitudinal traverse 22 can here be waived, which largely simplifies the construction of the removal device 15.

The invention claimed is:

1. A honeycomb storage unit comprising:
at least one shelf (1) having a plurality of storage units (8) arranged side-by-side and over top of each other, accessible from an operating side to receive cartridges (7), the storage units (8) being embodied such that that at the operating side the cartridges (7) are removable horizontally from the storage units (8) in a longitudinal direction and are insertable therein,
a shelf operating device (4) at the operating side,
a commissioning device (11), arranged on a front side (10) of the shelf (1) located opposite the operating side, and with a plurality of storage sites allocated thereto, used as marshaling storage units (9), with the marshaling storage units (9) being embodied such that the cartridges (7) located therein can also be removed at the front side (10) of the shelf (1), with the commissioning device (11) comprising several commissioning sites (12) for placing ones of the cartridges (7), a commissioning cart (14) that can move along the front (10) of the shelf (1), perpendicular in reference to the cartridges (7), that is embodied to approach essentially all of the commissioning sites (12), and a removal device (15) that is mobile along the front (10) of the shelf (1), perpendicular to the cartridges (7), that is configured for pulling out ones of the cartridges (7) from the marshaling storage units (9) and returning them thereto, and
the commissioning cart (14) has a length which is adjusted to a length of one said cartridge (7) in order to longitudinally straddle said cartridge, and includes at respective facial end sections thereof respective mechanically or electronically controlled cart elements (18), with at least one of said cart elements (18) being equipped with an operator platform (21).

2. The honeycomb storage system according to claim 1, wherein the removal device (15) is arranged at the commissioning cart (14).

3. The honeycomb storage system according to claim 1, wherein the removal device (15) is independent from the commissioning cart (14).

4. The honeycomb storage system according to claim 1, wherein the removal device (15) further comprises at least two operating levels (A, B) in order to optionally cooperate with two or more of the marshaling storage units (9) of the shelf (1) arranged over top of each other, and a lifting and lowering device configured for moving the cartridges (7) between the operating level (A, B).

5. The honeycomb storage system according to claim 1, wherein the removal device (15) further comprises a longitudinal traverse (22) which is adjusted to a length of the cartridge (7) in order to straddle the cartridge longitudinally and is provided with a motorized manipulation device (24) for pulling and pushing one of the cartridges (7) along the longitudinal traverse (22).

6. The honeycomb storage system according to claim 5, wherein the longitudinal traverse (22) of the removal device (15) is connected at facial end sections thereof to respectively a cart, guided mechanically or electronically, with the carts (27) forming together with the longitudinal traverse (22) a clear space underneath the longitudinal traverse (22), which is adjusted to dimensions of one of the cartridges (7) for an unhindered crossing over of the cartridges (7) located on commissioning sites (12).

7. The honeycomb storage system according to claim 1, wherein the commissioning cart (14) comprises at least one intermediate storage structure (17) for a temporary storage of long goods, with a length thereof being adjusted to the length of one said cartridge (7) in order to longitudinally straddle said cartridge, and the intermediate storage structure (17) at respective facial end sections thereof is connected to the respective cart elements (18), said cart elements (18) together with the intermediate storage structure (17) form a clear space underneath the intermediate storage structure (17) which for the unhindered crossing of cartridges (7) is adjusted to dimensions of the cartridge (7) placed on the commissioning sites (12).

8. The honeycomb storage system according to claim 7, wherein the intermediate storage structure (7) of the commissioning cart (14) comprises a traverse (19) with lateral braces (20) arranged thereat.

9. The honeycomb storage system according to claim 1, wherein the commissioning cart (14) is equipped with at least one manipulator for work pieces stored in cartridges (7).

10. The honeycomb storage system according to claim 1, wherein the commissioning sites (12) are formed by support structures (16) for the cartridges (7), with a level of the support structures (16) generally being essentially equivalent to a level of a lowermost marshaling storage unit (9) in the shelf.

11. A commissioning device for a honeycomb storage system according to claim 1, comprising the commissioning sites (12) for the storing cartridges (7), the commissioning cart (14) that is movable in a perpendicular direction to the cartridges (7), which is embodied to approach all of the commissioning sites (12), and the removal device (15) that can move in the perpendicular direction to the cartridges (7) for pulling out and inserting ones of the cartridges (7) out of and into the marshaling storage units (9) of the honeycomb storage system in order to place the cartridges (7) on the commissioning sites (12) or to return them therefrom.

12. The commissioning device according to claim 11, wherein the removal device (15) is arranged at the commissioning cart (14).

13. The commissioning device according to claim 11, wherein the removal device (15) is independent from the commissioning cart (14).

14. The commissioning device according to claim 11, wherein the removal device (15) comprises at least two operating levels (A, B) and is provided with a lifting and lowering device for moving ones of said cartridges (7) between the operating levels (A, B).

15. A commissioning cart for a honeycomb storage system according to claim 1, comprising at least one intermediate storage structure (17) for temporarily storing long goods, with a length thereof being adjusted to a length of one said cartridge (7) in order to straddle said cartridge longitudinally, the two mechanically or electronically controlled cart elements (18) being connected to the intermediate storage structure (17) at the facial end sections thereof that form together with the intermediate storage structure (17) a clear space underneath the intermediate storage structure (17), which is adjusted to dimensions of one said cartridge (7) for an unhindered crossing of cartridges (7) placed on commissioning sites (12).

16. The commissioning cart according to claim 15, wherein the intermediate storage structure (17) essentially comprising a traverse (19) with lateral braces (20) arranged thereat.

17. A commissioning cart for a honeycomb storage system, the honeycomb storage system including at least one shelf (1) having a plurality of storage units (8) arranged side-by-side and over top of each other, accessible from an operating side to receive cartridges (7), the storage units (8) being embodied such that that at the operating side the cartridges (7) are removable horizontally from the storage units (8) in a longitudinal direction and are insertable therein, a shelf operating device (4) at the operating side, a commissioning device (11), arranged on a front side (10) of the shelf (1) located opposite the operating side, and with a plurality of storage sites allocated thereto, used as marshaling storage units (9), with the marshaling storage units (9) being embodied such that the cartridges (7) located therein can also be removed at the front side (10) of the shelf (1), with the commissioning device (11) comprising several commissioning sites (12) for placing ones of the cartridges (7), the commissioning cart, and a removal device (15) that is mobile along the front (10) of the shelf (1), perpendicular to the cartridges (7), that is configured for pulling out ones of the cartridges (7) from the marshaling storage units (9) and returning them thereto, the commissioning cart (14) comprising a length which is adjusted to a length of the cartridge (7) in order to straddle said cartridge, and comprising at respective facial end sections thereof respective mechanically or electronically controlled rail-guided cart elements (18), with at least one of these cart elements (18) being provided with an operator platform (21).

18. A commissioning cart for a commissioning system according to claim 11, wherein the commissioning cart (14) is equipped with at least one manipulator for work pieces stored in the cartridges (7).

19. The commissioning cart according to claim 18, wherein the commissioning cart (14) comprises a removal device (15) or is embodied cooperating with such a removal device.

* * * * *